United States Patent
Gong

(10) Patent No.: US 7,447,425 B2
(45) Date of Patent: Nov. 4, 2008

(54) METHOD OF ZOOMING IMAGE IN WIRELESS TERMINAL AND WIRELESS TERMINAL IMPLEMENTING THE SAME

(75) Inventor: Sung-Hwa Gong, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 416 days.

(21) Appl. No.: 11/385,866

(22) Filed: Mar. 22, 2006

(65) Prior Publication Data

US 2006/0291738 A1    Dec. 28, 2006

(30) Foreign Application Priority Data

Jun. 7, 2005   (KR) .................. 10-2005-0048282

(51) Int. Cl.
*G03B 13/02* (2006.01)
*G03B 17/00* (2006.01)
*H04N 5/262* (2006.01)
*H04N 5/222* (2006.01)

(52) U.S. Cl. ............... 396/60; 396/374; 348/240.2; 348/333.05; 348/333.12

(58) Field of Classification Search ............ 396/60, 396/374, 147; 348/240.2, 333.05, 333.11, 348/333.12, 346
See application file for complete search history.

(56) References Cited

U.S. PATENT DOCUMENTS 5,023,719 A * 6/1991 Zwirn ............... 348/240.2
5,172,234 A * 12/1992 Arita et al. ........... 348/240.2
6,522,360 B1 * 2/2003 Miyawaki et al. ....... 348/347
6,812,967 B1 * 11/2004 Niikawa et al. ...... 348/333.05
2001/0013854 A1   8/2001 Ogoro
2003/0022699 A1   1/2003 Lin
2005/0128333 A1 * 6/2005 Park et al. .......... 348/333.12
2006/0114987 A1 * 6/2006 Roman ............. 375/240.01

FOREIGN PATENT DOCUMENTS

GB         2 403 096    12/2004
WO         WO 00/41378   7/2000

* cited by examiner

*Primary Examiner*—W. B. Perkey
(74) *Attorney, Agent, or Firm*—Roylance, Abrams, Berdo & Goodman, LLP

(57) ABSTRACT

A method and wireless terminal for zooming an image in a wireless terminal are provided, in which information of a selected image is analyzed, when a predetermined image is selected in an image edit mode; control is authorized to a second controller, if the selected image is a high resolution image; the selected image is displayed on a first screen and a zoom box used to select a partial image to be zoomed is displayed on a second screen, under the control of the second controller; a zoom function is performed while displaying the partial image selected by the zoom box on the first screen, if a zoom mode is selected; and a partial image selected by the moved zoom box is displayed on the first screen, when moving the zoom box.

12 Claims, 4 Drawing Sheets

METHOD OF ZOOMING IMAGE IN WIRELESS TERMINAL AND WIRELESS TERMINAL IMPLEMENTING THE SAME

PRIORITY

This application claims the benefit under 35 U.S.C. § 119 (a) of a Korean Patent Application filed in the Korean Intellectual Property Office on Jun. 7, 2005 and assigned Serial No. 2005-48282, the entire disclosure of which is hereby incorporated by reference.

BACKGROUND OF THE INVENTION

1. Field of the Invention

The present invention relates generally to a method and wireless terminal for zooming an image. More particularly, the present invention relates to a method and wireless terminal for zooming a portion of an image selected by a user at a predetermined ratio.

2. Description of the Related Art

Recently, conventional wireless terminals used for communicating during a phone call have been developed with a data communication function, such as General Packet Radio Services (GPRS), Code Division Multiple Access data only (CDMA EV-DO), Code Division Multiple Access data and voice (CDMA EV-DV), and Wideband Code Division Multiple Access (WCDMA) High Speed Downlink Packet Access (HSDPA), along with additional functions. The capability of bulk data communication allows the wireless terminals to provide multimedia services such as video on demand (VOD) streaming broadcasting and video calls. For example, by adding a camera function to such a wireless terminal, when a user photographs images using the wireless terminal, the wireless terminal also provides an image edit function for editing the photographed and stored images. However, high resolution of the camera function results in an increase number of pixels of an image. Thus, when a conventional edit method is used, an edit function, such as zooming, for high resolution image data cannot be performed when implementing other functions.

Accordingly, there is a need for an improved method of zooming high resolution image data using a wireless terminal.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method of zooming a high resolution image in a wireless terminal.

According to one aspect of exemplary embodiments of the present invention, there is provided a method and wireless terminal for zooming an image in a wireless terminal, in which information of the selected image is analyzed, when a predetermined image is selected in an image edit mode; authorizing control to a second controller, if the selected image is a high resolution image; the selected image is displayed on a first screen and a zoom box used to select a partial image to be zoomed is displayed on a second screen, under a control of the second controller; a zoom function is performed while displaying the partial image selected by the zoom box on the first screen, if a zoom mode is selected; and a partial image selected by the moved zoom box is displayed on the first screen, when moving the zoom box.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. In exemplary embodiments of the present invention, a display area size of a display unit 50 may be 320×240, the display area size of a first screen may be 176×144, and the display area size of a second screen may be 80×60.

Figure 1:
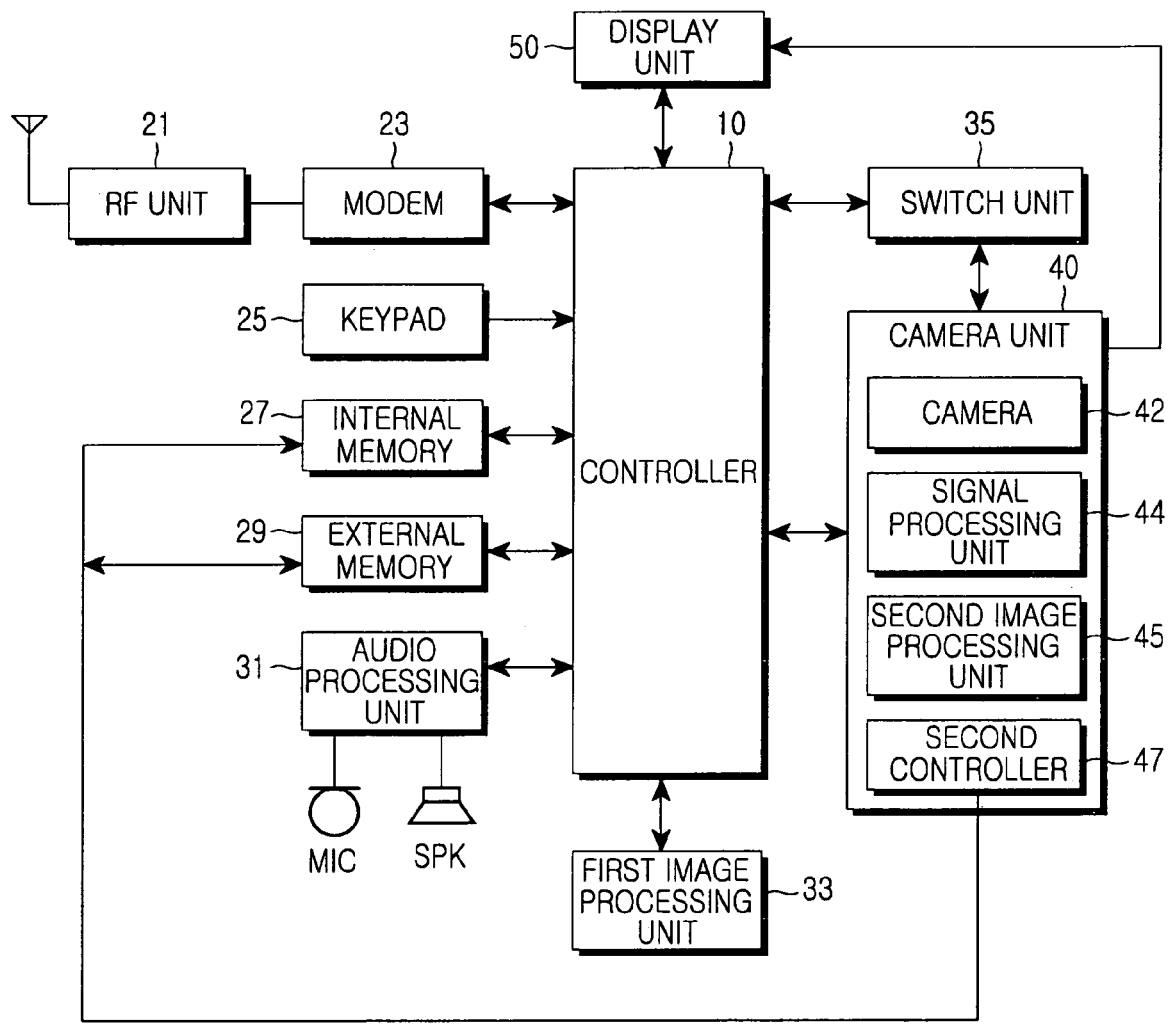
FIG. 1 is a block diagram of a wireless terminal according to an exemplary embodiment of the present invention.

FIG. 1 is a block diagram of a wireless terminal according to an exemplary embodiment of the present invention. The wireless terminal may be a mobile telephone.

Referring to FIG. 1, a radio frequency (RF) unit 21 performs communication of the wireless terminal. The RF unit 21 includes an RF transmitter, which up-converts a frequency of a signal to be transmitted, and amplifies the up-converted signal. The RF unit 21 also includes an RF receiver, which includes low noise that amplifies a received signal and down-converts a frequency of the low noise amplified signal.

A modem 23 includes a transmitter encoding and modulating the signal to be transmitted, and a receiver demodulating and decoding the received signal.

A keypad 25 includes keys for inputting numeral and character information, and function keys for setting various functions. The keypad 27 may include a function key to perform a zoom function in a zoom mode of an image edit mode, according to an exemplary embodiment of the present invention.

An internal memory 27 may include a program memory and a data memory. The program memory stores programs for controlling a general operation of the wireless terminal. According to an exemplary embodiment of the present invention, the program memory also stores programs required to process data stored in an external memory 29. The data memory temporarily stores data generated during the execution of the programs. According to an exemplary embodiment of the present invention, the data memory also stores a plurality of images having various resolutions.

The external memory 29 may be a very small sized memory card used as a storage device of image data, audio data, and text data. According to an exemplary embodiment of the present invention, the external memory 29 may also store a plurality of images having various resolutions.

An audio processing unit 31 may be configured with a codec, which includes a data codec processing packet data and an audio codec processing an audio signal, such as voice. The audio processing unit 31 converts a digital audio signal received from the modem 23 to an analog audio signal using the audio codec and reproduces the converted analog audio signal, or converts an analog audio signal generated by a microphone to a digital audio signal using the audio codec and transmits the converted digital audio signal to the modem 23.

A first image processing unit 33 generates image data for displaying the image signal. A controller 10 controls the first image processing unit 33 to generate image data suitable for the specification of the display unit 50 using a received image signal, and compress (zooms-out) and magnify (zooms-in) the image data. In addition, the controller 10 controls the first image processing unit 33 to transmit a start address value of the output image data to the display unit 50, or change the start address value and transmit the changed start address value to the display unit 50.

A switch unit 35 switches to the controller 10 for processing general data and editing medium/low resolution image data, and switches to a second controller (multimedia controller) 47 included in a camera unit 40 for editing high resolution image data.

The camera unit 40 includes a camera 42, signal processing unit 44, second image processing unit 45, and the second controller (multimedia controller) 47. The camera unit 40 converts an image signal output from the camera 42 to image data and compresses and magnifies the image data to be suitable for the specification of the display unit 50. According to an exemplary embodiment of the present invention, the camera unit 40 processes high resolution image data. That is, when a zoom mode of a zoom and edit mode is selected, the camera unit 40 controls the display unit 50 to zoom a partial image selected by a zoom box at a predetermined ratio and display the zoomed partial image on the first screen. When the zoom box is moved, the camera unit 40 controls the display unit 50 to display a partial image selected by the moved zoom box on the first screen.

The controller 10 controls a general operation of the wireless terminal. The controller 10 may include the modem 23 and the codec. According to an exemplary embodiment of the present invention, when an image to be zoomed and edited is selected, the controller 10 analyzes information of the selected image. If the selected image is high resolution image data, the controller 10 controls the switch unit 35 to authorize control by the second controller 47, as an analysis result. If the selected image is medium/low resolution image data, the controller 10 controls the switch unit 35 to switch to the controller 10. In addition, if the zoom mode of the zoom and edit mode is selected, the controller 10 controls the display unit 50 to zoom a partial image selected by the zoom box at a predetermined ratio and display the zoomed partial image on the first screen. When the zoom box is moved, the controller 10 controls the display unit 50 to display a partial image selected by the moved zoom box on the first screen.

The display unit 50 displays image data generated according to a zoom and edit operation. A liquid crystal display (LCD) may be used for the display unit 50. In an exemplary implementation, the display unit 50 may include an LCD controller, memory for storing image data, and LCD display element. When the LCD is implemented in a touch screen method, the keypad 27 and the LCD may be an input unit. According to an exemplary embodiment of the present invention, the display unit 50 may display the first screen and the second screen in the zoom and edit mode. The first screen displays an original image of a selected image, and the second screen displays the zoom box and a reduced image of the selected image together.

An operation of the wireless terminal will now be described with reference to FIG. 1. When a user wants to make a phone call, if the user sets an outgoing mode after performing a dialing operation using the keypad 25, the controller 10 senses the outgoing mode, controls the modem 23 to process the received dial information, and controls the RF unit 21 to convert a dial signal to an RF signal and transmit the RF signal through an antenna. If a subscriber on a reception side generates a response signal, the controller 10 senses the response signal through the RF unit 21 and the modem 23. Thereafter, the controller 10 performs a communication function by forming a voice call path using the audio processing unit 31. In an incoming mode using the modem 23, the controller 10 senses that the wireless terminal is in the incoming mode and generates a ring signal using the audio processing unit 31. When the user responds to the incoming call, the controller 10 senses the response and performs the communication function by forming a voice call path using the audio processing unit 31. In the outgoing mode and the incoming mode, voice communication has been described as an example, however, a data communication function to transmit/receive packet data and image data may be performed instead of the voice communication. In an idle mode or when a short message service is performed, the controller 10 displays character data processed through the modem 23 on the display unit 50.

An operation of zooming an image in the wireless terminal will now be described with reference to FIGS. 2 and 3.

Figure 2:
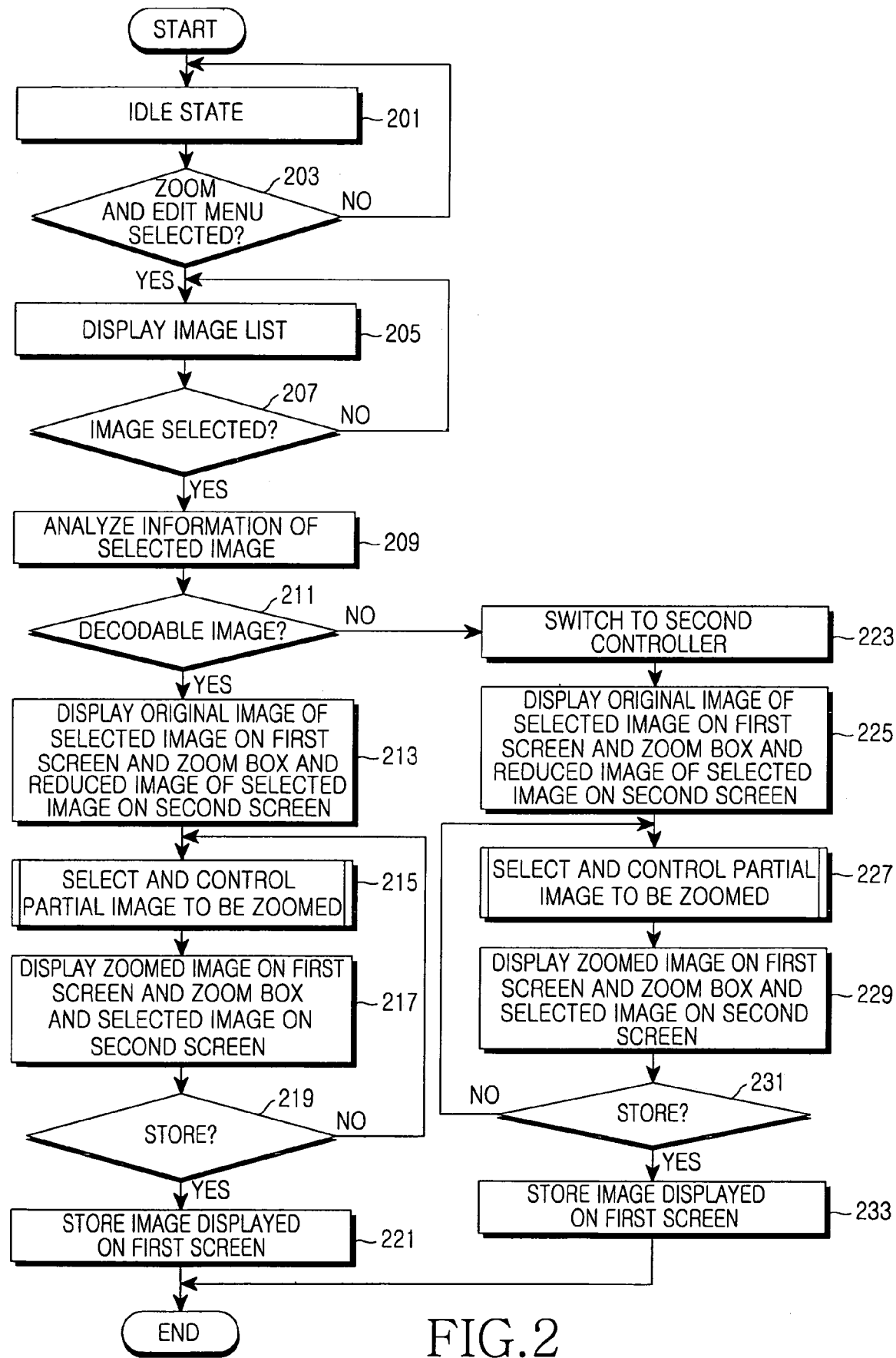
FIG. 2 is a flowchart of a method of zooming an image in a wireless terminal, according to an exemplary embodiment of the present invention.

FIG. 2 is a flowchart of a method of zooming an image in a wireless terminal, according to an exemplary embodiment of the present invention. The method will now be described in conjunction with FIG. 1.

Referring to FIG. 2, in an idle mode of step 201, if a user selects a zoom and edit menu or key using the keypad 25, the controller 10 senses the menu or key selection in step 203 and displays a list of stored images by controlling the internal memory 27 (or the external memory 29) and the display unit 50 in step 205.

If the user selects an image to be edited from the displayed image list using the keypad 25, the controller 10 senses the image selection in step 207 and analyzes information of the selected image in step 209. The image information includes pixel information, size information, contents information, and time information of the image.

Figure 4A:
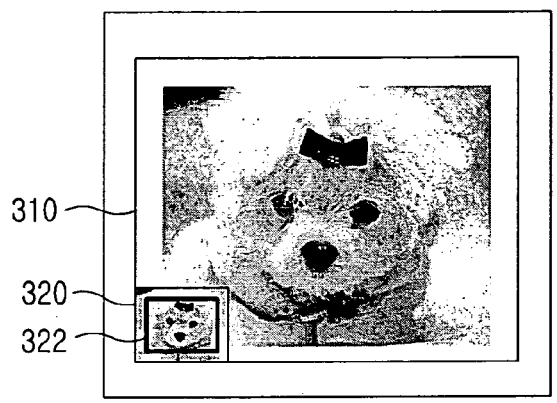
FIG. 4 illustrates screens according to an exemplary embodiment of the present invention.

The controller 10 determines in step 211 whether the selected image has a decodable resolution through the image information analysis. As the determination result, if the selected image is a decodable medium/low resolution image, the controller 10 controls the display unit 50 to separately display the first screen and the second screen as illustrated in FIG. 4A, in step 213. The first screen displays an original image of the selected image, and the second screen displays the zoom box and a reduced image of the selected image together. The zoom box is a tool used to zoom a partial image of the original image displayed on the first screen and to select a location of the partial image. The size of the zoom box may be changed. In FIG. 4A, reference numeral 310 denotes the first screen, reference numeral 320 denotes the second screen, and reference numeral 322 denotes the zoom box.

When the user selects a partial image to be zoomed by moving the zoom box and performs a key operation for zooming the selected partial image using the keypad 25, the controller 10 zooms the selected partial image in response to the user's key operation by controlling the internal memory 27 and the display unit 50 in step 215. The operation of moving the zoom box and zooming the selected partial image will later be described in detail with reference to FIG. 3.

Figure 4B:
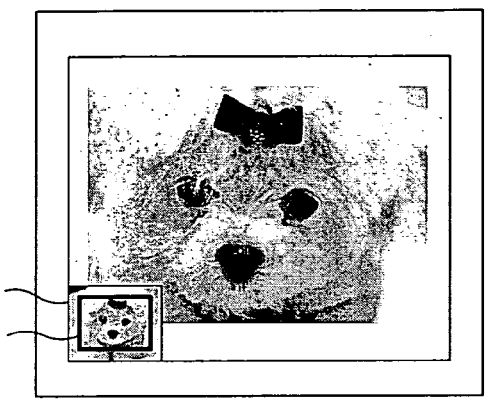

According to the operation of zooming the selected partial image in step 215, as illustrated in FIG. 4B, the controller 10 controls the display unit 50 to display a zoomed image of the selected partial image on the first screen and display a reduced image of the selected image and the zoom box on the second screen in step 217.

Figure 4C:
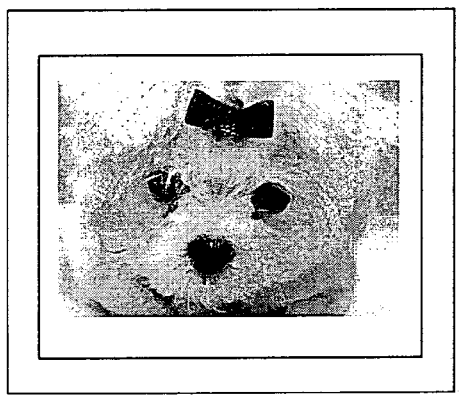

When the user presses a storage key using the keypad 25, the controller 10 senses the storage key selection in step 219, and controls the internal memory 27 (or the external memory 29) and the display unit 50 to display the image displayed on the first screen as a magnified image as illustrated in FIG. 4C, and store the magnified image in step 221.

Figure 4D:
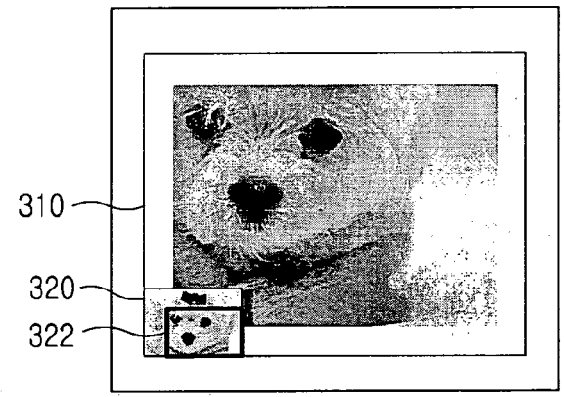

If the selected image is an undecodable high resolution image, as the determination result of step 211, the controller 10 controls the switch unit 35 to switch to the second controller 47 and authorize control to the second controller 47 for controlling a zoom and edit operation of the selected image in step 223. The second controller 47, having authorized control, controls the display unit 50 to separately display the first screen and the second screen in step 225. The first screen displays an original image of the selected image, and the second screen displays the zoom box and a reduced image of the selected image together as illustrated in FIG. 4D.

When the user selects a partial image to be zoomed by moving the zoom box and performs a key operation for zooming the selected partial image using the keypad 25, the controller 10 senses a signal corresponding to the key operation and transmits the sensed signal to the second controller 47. The second controller 47 zooms the selected partial image in response to the user's key operation by controlling the internal memory 27 and the display unit 50 in step 227. The operation of moving the zoom box and zooming the selected partial image will later be described in detail with reference to FIG. 3.

According to the operation of zooming the selected partial image in step 227, the second controller 47 controls the display unit 50 to display a zoomed image of the selected partial image on the first screen and display a reduced image of the selected image and the zoom box on the second screen in step 229.

When the user presses a storage key using the keypad 25, the controller 10 senses a signal corresponding to the storage key and transmits the sensed signal to the second controller 47 in step 231. The second controller 47 controls the internal memory 27 (or the external memory 29) and the display unit 50 to display the image displayed on the first screen as a magnified image as illustrated in FIG. 4C and store the magnified image in step 233.

Figure 3:
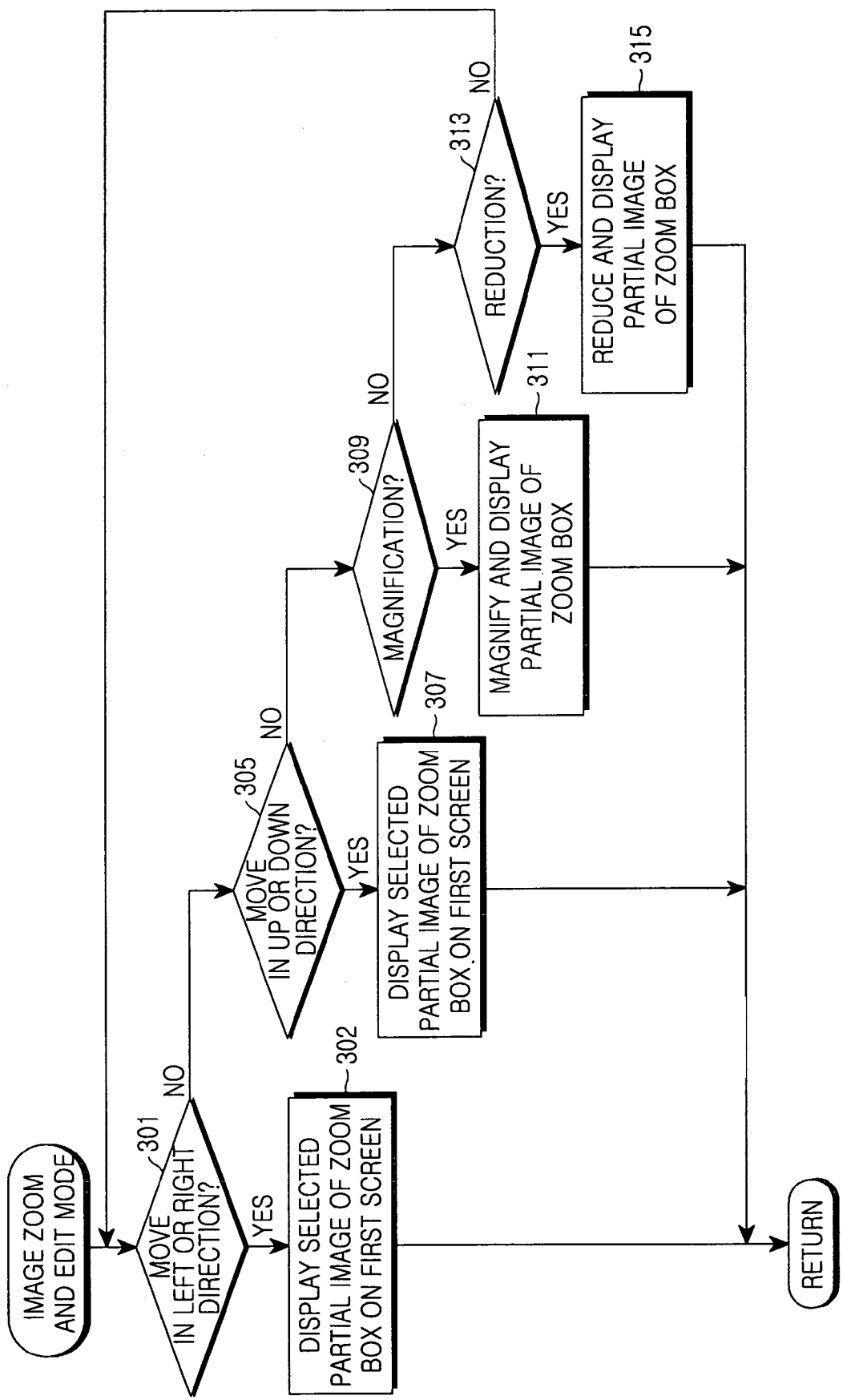
FIG. 3 is a detailed flowchart of a method of selecting and zooming a partial image of FIG. 2.

FIG. 3 is a detailed flowchart of a method of selecting and zooming the partial image of FIG. 2. According to a resolution of the image, the controller 10 or the second controller 47 controls the image zoom and edit operation. The controller 10 will be used for describing FIG. 3 below.

An operation of selecting and zooming the partial image to be zoomed using the zoom box will now be described with reference to FIG. 3. In the image zoom and edit mode, the first screen displays an original image of the selected image, and the second screen displays the zoom box and the reduced image of the selected image as illustrated in FIG. 4A. If the user moves a direction key included in the keypad 25 in the left or right direction, the controller 10 senses the left or right direction in step 301. In step 302, the controller 10 reads a coordinate value of the zoom box changed according to the movement in the left or right direction and extracts image data corresponding to the read coordinate value from the reduced image displayed on the second screen. The controller 10 scales the extracted image data to fit the display area size of the first screen and displays the scaled image data on the first screen. In an exemplary implementation, the zoom box may move in a pixel unit.

On the other hand, if the user moves the direction key included in the keypad 25 in the up or down direction, the controller 10 senses the up or down direction in step 305. In step 307, the controller 10 reads a coordinate value of the zoom box changed according to the movement in the up or down direction and extracts image data corresponding to the read coordinate value from the reduced image displayed on the second screen. The controller 10 scales the extracted image data to fit the display area size of the first screen and displays the scaled image data on the first screen.

Further, if the user selects a magnification key included in the keypad 25, the controller 10 senses the magnification key selection in step 309. In step 311, the controller 10 switches to a magnification mode for performing a magnification function, reads a coordinate value of the zoom box located in the second screen, and extracts image data corresponding to the read coordinate value from the reduced image displayed on the second screen. The controller 10 scales the extracted image data at a predetermined magnification ratio by controlling the internal memory 27 and displays the scaled image data on the first screen by the display area size of the first screen. In addition, every time the magnification key is selected, the selected partial image is displayed on the first screen at the predetermined magnification ratio.

If the user selects a reduction key included in the keypad 25, the controller 10 senses the reduction key selection in step 313. In step 315, the controller 10 switches to a reduction mode for performing a reduction function, reads a coordinate value of the zoom box located in the second screen, and extracts image data corresponding to the read coordinate value from the reduced image displayed on the second screen. The controller 10 scales the extracted image data at a predetermined reduction ratio by controlling the internal memory 27 and displays the scaled image data on the first screen by the display area size of the first screen. In addition, every time the reduction key is selected, the selected partial image is displayed on the first screen at the predetermined reduction ratio.

As described above, according to the exemplary embodiments of the present invention, by providing a method of zooming an image in a high resolution image edit mode in a wireless terminal, a zoom function can be conveniently performed by selecting a key in an image edit mode.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of zooming an image in a wireless terminal, the method comprising the steps of:

analyzing information of a selected image in a first controller, when an image is selected in an image edit mode;

authorizing control to a second controller, if the selected image comprises high resolution data;

displaying the selected image on a first screen and displaying a zoom box used to select a partial image to be zoomed on a second screen, under the control of the second controller;

performing a zoom function while displaying the partial image selected by the zoom box on the first screen, if a zoom mode is selected; and displaying a partial image selected by the moved zoom box on the first screen, when moving the zoom box.

2. The method of claim 1, wherein the first screen displays an original image of the selected image, and the second screen displays the zoom box and a reduced image of the selected image together.

3. The method of claim 1, further comprising, when a storage key is pressed, displaying a magnified image as the image displayed on the first screen and storing the magnified image.

4. The method of claim 1, wherein the zoom box moves in at least one of the up, down, left, and right direction.

5. The method of claim 1, wherein the second controller is comprised in a camera unit.

6. The method of claim 1, wherein the size of the zoom box changes according to the zoom of the partial image.

7. A wireless terminal for zooming an image, comprising:

a controller for analyzing information of a selected image, when an image is selected in an image edit mode;

a switch unit for switching control to a second controller, if the selected image comprises high resolution data; and a display unit for displaying the selected image on a first screen and displaying a zoom box used to select a partial image to be zoomed on a second screen, under the control of the second controller;

wherein the zoom box performs a zoom function while displaying the partial image selected by the zoom box on the first screen, if a zoom mode is selected, and displays a partial image selected by the moved zoom box on the first screen, when moving the zoom box.

8. The wireless terminal of claim 7, wherein the first screen displays an original image of the selected image, and the second screen displays the zoom box and a reduced image of the selected image together.

9. The wireless terminal of claim 7, further comprising a keypad comprising a storage key for displaying a magnified image as the image displayed on the first screen, when the storage key is pressed, and for storing the magnified image.

10. The wireless terminal of claim 7, wherein the zoom box moves in at least one of the up, down, left, and right direction.

11. The wireless terminal of claim 7, wherein the second controller is comprised in a camera unit.

12. The wireless terminal of claim 7, wherein the size of the zoom box changes according the partial image size.

* * * * *